United States Patent
Reis et al.

(10) Patent No.: US 12,294,289 B2
(45) Date of Patent: May 6, 2025

(54) SYSTEMS AND METHODS FOR RESONANT CONVERTER THERMAL AND RIPPLE CURRENT IMPROVEMENT USING TWO STAGE VOLTAGE LOOP

(71) Applicant: BorgWarner US Technologies LLC, Wilmington, DE (US)

(72) Inventors: Alexandre M. S. Reis, Westfield, IN (US); Sunil Sreedhar, Westfield, IN (US); Abhishek Vijay Danekar, Kokomo, IN (US)

(73) Assignee: BorgWarner US Technologies LLC, Wilmington, DE (US)

(*) Notice: Subject to any disclaimer, the term of this patent is extended or adjusted under 35 U.S.C. 154(b) by 208 days.

(21) Appl. No.: 18/323,748

(22) Filed: May 25, 2023

(65) Prior Publication Data
US 2024/0396431 A1    Nov. 28, 2024

(51) Int. Cl.
*H02M 1/14* (2006.01)
*B60L 53/20* (2019.01)
*H02J 7/02* (2016.01)
*H02M 1/42* (2007.01)
*H02M 7/219* (2006.01)

(52) U.S. Cl.
CPC ............... *H02M 1/14* (2013.01); *B60L 53/20* (2019.02); *H02J 7/02* (2013.01); *H02M 1/4266* (2013.01); *H02M 7/219* (2013.01); *B60L 2210/10* (2013.01); *B60L 2210/30* (2013.01); *H02J 2207/20* (2020.01)

(58) Field of Classification Search
CPC .......... H02M 1/12; H02M 1/32; H02M 1/322; H02M 3/3155; H02M 3/158; H02M 3/33507; H02M 3/33546; H02M 7/1557; H02M 7/1626; H02M 1/4208; H02M 7/53871; H02M 7/12; H02M 7/219; H02M 7/151; H02M 1/4233; H02M 5/4585; H02M 7/217; H02M 1/08; H02M 7/1552; H02M 7/1623; H02M 1/4225; H02M 3/33592; H02M 3/073; H02M 3/10; H02M 3/135; H02M 3/137; H02M 7/10;
(Continued)

(56) References Cited

U.S. PATENT DOCUMENTS

| | | | |
|---|---|---|---|
| 9,973,097 B2 * | 5/2018 | Wambsganss | H02M 1/44 |
| 10,569,800 B2 * | 2/2020 | Terdy | B62D 6/001 |
| 11,309,790 B2 * | 4/2022 | Jacques | H02M 3/33507 |

OTHER PUBLICATIONS

Khaligh Alireza et al: "Global Trends in High-Power On-Board Chargers for Electric Vehicles", IEEE Transactions on Vehicular Technology, IEEE, USA, vol. 68, No. 4, Apr. 1, 2019 (Apr. 1, 2019), pp. 3306-3324, XP011719667,ISSN: 0018-9545, DOI: 10.1109/TVT.2019.2897050.
(Continued)

*Primary Examiner* — Jeffrey A Gblende
(74) *Attorney, Agent, or Firm* — Joshua M. Haines; Bookoff McAndrews, PLLC

(57) ABSTRACT

A system includes: an alternating current (AC) to direct current (DC) converter (AC-DC converter), the AC-DC converter including a bulk capacitor; a DC-DC converter connectable to the AC-DC converter; and one or more controllers configured to control the system by performing operations, the operations including: determining a current demand of a load, the load being connectable to the DC-DC converter, for a charging cycle of the load; performing a first comparison of the current demand to one or more current demand thresholds; and generating a voltage setpoint for the bulk capacitor based on the first comparison, wherein the generation of the voltage setpoint limits output current ripple of the DC-DC converter for the charging cycle.

20 Claims, 10 Drawing Sheets

(58) Field of Classification Search
CPC ........ H02M 7/00; H02M 7/06; H02M 7/064;
H02M 7/068; H02M 3/156; H02M
7/5387; H02M 1/083; H02M 1/14; H02M
1/4216; H02M 1/4266; G05F 1/30; G05F
1/33; G05F 1/32; G05F 1/34; G05F 1/38;
G05F 1/52; H02J 7/12
See application file for complete search history.

(56) References Cited

OTHER PUBLICATIONS

Pandey Rah UL et al: "PFC-SEP IC converter-fed half-bridge LLC resonant converter fore-bike charging applications", IET Electrical Systems in Transportation, the Institution of Engineering and Technology, Michael Faraday House, Six Hills Way, Stevenage, Herts. SG1 2AY, UK, vol. 10, No. 3, Sep. 1, 2020, pp. 225-233, XP006091977, ISSN: 2042-9738, DOI: 10.1049/IET-EST.2019.0001.
Zhang Hailong et al: "DC-Link and Switched Capacitor Control for Varying Coupling Conditions in Inductive Power Transfer System for Unmanned Aerial Vehicles", IEEE Transactions on Power Electronics, Institute of Electrical and Electronics Engineers, USA, vol. 36, No. 5, Oct. 20, 2020 (Oct. 20, 2020), pp. 5108-5120, XP011832661,ISSN: 0885-8993, DOI: 10.1109/TPEL. 2020. 3032155.
Zhao Shuang et al: "Variable DC-Link Voltage LLC Resonant DC/DC Converter Using Wide Band Gap Semiconductor Devices", 2021 IEEE Applied Power Electronics Conference and Exposition (APEC), IEEE, Jun. 14, 2021 (Jun. 14, 2021), pp. 1977-1984, XP033944669,DOI: 10.1109/APEC42165.2021.9487197.

\* cited by examiner

SYSTEMS AND METHODS FOR RESONANT CONVERTER THERMAL AND RIPPLE CURRENT IMPROVEMENT USING TWO STAGE VOLTAGE LOOP

TECHNICAL FIELD

Various embodiments of the present disclosure relate generally to systems and methods for resonant converter thermal and ripple current improvement using two stage voltage loop and, more particularly, to systems and methods for generating a voltage setpoint for a bulk capacitor for a system including a power factor correction (PFC) converter, a high voltage direct current (HVDC) converter, and one or more controllers.

BACKGROUND

In the field of battery chargers, a two-stage layout is generally used to meet a requirement for use in automotive vehicles as an onboard charger. These onboard chargers have high power density, with less weight and require less space. Some systems may not meet increased efficiency requirements and/or higher power density of an on-board charger.

The present disclosure is directed to overcoming one or more of these above-referenced challenges.

SUMMARY OF THE DISCLOSURE

In some aspects, the techniques described herein relate to a system including: an alternating current (AC) to direct current (DC) converter (AC-DC converter), the AC-DC converter including a bulk capacitor; a DC-DC converter connectable to the AC-DC converter; and one or more controllers configured to control the system by performing operations, the operations including: determining a current demand of a load, the load being connectable to the DC-DC converter, for a charging cycle of the load; performing a first comparison of the current demand to one or more current demand thresholds; and generating a voltage setpoint for the bulk capacitor based on the first comparison, wherein the generation of the voltage setpoint limits output current ripple of the DC-DC converter for the charging cycle.

In some aspects, the techniques described herein relate to a system, wherein the current demand is determined based on one or more of: a current limit associated with the load, a voltage limit associated with the load, a voltage level associated with a voltage source connected to the AC-DC converter, or a circuit topology of the AC-DC converter.

In some aspects, the techniques described herein relate to a system, wherein the one or more current demand thresholds include a low current demand threshold and a high current demand threshold, wherein the operations further include: determining a load current through the load; performing a second comparison of the current demand to the load current in response to the current demand being determined to be less than or equal to the low current demand threshold; and generating an output current error based on the second comparison, wherein the voltage setpoint is further generated based on the output current error.

In some aspects, the techniques described herein relate to a system, wherein the operations further include: detecting a previously generated voltage setpoint of the bulk capacitor; and adjusting the generated voltage setpoint based on the previously generated voltage setpoint.

In some aspects, the techniques described herein relate to a system, wherein the one or more current demand thresholds include a low current demand threshold high current demand threshold, wherein the operations further include: determining a switching frequency of the DC-DC converter; determining a minimum switching frequency threshold of the DC-DC converter and a switching frequency demand threshold of the DC-DC converter; and performing a third comparison of the switching frequency to the minimum switching frequency threshold in response to the current demand being determined to be greater than or equal to the high current demand threshold, wherein the voltage setpoint is increased in response to the switching frequency being determined to be less than the minimum switching frequency threshold, to cause the switching frequency to adjust to a value between the minimum switching frequency threshold and the switching frequency demand threshold.

In some aspects, the techniques described herein relate to a system, wherein the one or more current demand thresholds include a low current demand threshold and a high current demand threshold, wherein the operations further include: determining a switching frequency of the DC-DC converter; determining a minimum switching frequency threshold of the DC-DC converter and a switching frequency demand threshold of the DC-DC converter; and performing a fourth comparison of the switching frequency to the switching frequency demand threshold in response to the current demand being determined to be greater than or equal to the high current demand threshold, wherein the voltage setpoint is decreased in response to the switching frequency being determined to be greater than the switching frequency demand threshold, to cause the switching frequency to adjust to a value between the minimum switching frequency threshold and the switching frequency demand threshold.

In some aspects, the techniques described herein relate to a system, wherein the one or more current demand thresholds include a low current demand threshold and a high current demand threshold, wherein the operations further include: determining a switching frequency of the DC-DC converter; determining a minimum switching frequency threshold of the DC-DC converter and a switching frequency demand threshold of the DC-DC converter; and performing a fifth comparison of the switching frequency to the minimum switching frequency threshold and the switching frequency demand threshold in response to the current demand being determined to be greater than or equal to the high current demand threshold, wherein the voltage setpoint is unchanged in response to the switching frequency being determined to be between the minimum switching frequency threshold and the switching frequency demand threshold.

In some aspects, the techniques described herein relate to a system, wherein the load includes a battery, and wherein the AC-DC converter is configured to provide the system as a battery charger for the battery of the load for the charging cycle.

In some aspects, the techniques described herein relate to a system, further including: a motor configured to rotate based on power received from the battery, wherein the system is provided as a vehicle, wherein the one or more current demand thresholds include a low current demand threshold and a high current demand threshold, wherein generating the voltage setpoint is based on a frequency based offset control method or a current based offset control method of the DC-DC converter, wherein the frequency based offset control method is triggered when the current demand is less than or equal to the low current demand threshold, and wherein the current based offset control method is triggered when the current demand is greater than or equal to the high current demand threshold.

In some aspects, the techniques described herein relate to a method for controlling a system, the system including an alternating current (AC) to direct current (DC) converter (AC-DC converter); a DC-DC converter connectable to the AC-DC converter, the AC-DC converter including a bulk capacitor; and a load connectable to the DC-DC converter, the method including: performing, by one or more controllers, operations for a current based offset control method for the DC-DC converter, including: determining a current demand of the load for a charging cycle; determining a current through the load; performing a comparison of the current demand to the current in response to the current demand being determined to be less than or equal to a low current demand threshold; generating an output current error based on the comparison; and generating a voltage setpoint of the bulk capacitor based on the output current error, to limit output current ripple of the DC-DC converter for the charging cycle.

In some aspects, the techniques described herein relate to a method, wherein a switching frequency for the DC-DC converter is fixed to a resonant frequency of the DC-DC converter for the charging cycle.

In some aspects, the techniques described herein relate to a method, wherein the DC-DC converter includes an LLC resonant converter.

In some aspects, the techniques described herein relate to a method, wherein the load includes a battery, wherein the AC-DC converter is configured to provide the system as a battery charger for the battery of the load for the charging cycle.

In some aspects, the techniques described herein relate to a method, wherein the operations further include: detecting a previously generated voltage setpoint of the bulk capacitor; and adjusting the generated voltage setpoint based on the previously generated voltage setpoint.

In some aspects, the techniques described herein relate to a method, wherein the current demand is determined based on one or more of: a current limit associated with the load, a voltage limit associated with the load, a voltage level associated with a voltage source connected to the AC-DC converter, and a circuit topology of the AC-DC converter.

In some aspects, the techniques described herein relate to a system including: one or more controllers configured to perform operations including: determining a current demand of a load for a charging cycle; determining a switching frequency of a direct current (DC) to DC converter (DC-DC converter); determining a minimum switching frequency threshold of the DC-DC converter and a switching frequency demand threshold of the DC-DC converter; performing a comparison of the switching frequency to the minimum switching frequency threshold and the switching frequency demand threshold in response to the current demand being determined to be greater than or equal to a high current demand threshold; and generating a voltage setpoint for a bulk capacitor based on the comparison, to limit output current ripple of the DC-DC converter for the charging cycle.

In some aspects, the techniques described herein relate to a system, the operations further including: increasing the generated voltage setpoint in response to the switching frequency being determined to be less than the minimum switching frequency threshold, to cause the switching frequency to adjust to a value between the minimum switching frequency threshold and the switching frequency demand threshold.

In some aspects, the techniques described herein relate to a system, the operations further including: decreasing the voltage setpoint in response to the switching frequency being determined to be greater than the switching frequency demand threshold, to cause the switching frequency to adjust to a value between the minimum switching frequency threshold and the switching frequency demand threshold.

In some aspects, the techniques described herein relate to a system, the operations further including: maintaining the voltage setpoint in response to the switching frequency being determined to be between the minimum switching frequency threshold and the switching frequency demand threshold.

In some aspects, the techniques described herein relate to a system, wherein the switching frequency includes an instantaneous switching frequency, wherein the DC-DC converter is configured to operate in a fixed duty cycle mode, and wherein the minimum switching frequency threshold includes a first value less than a resonant frequency of the DC-DC converter and the switching frequency demand threshold includes a second value greater than the resonant frequency of the DC-DC converter.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
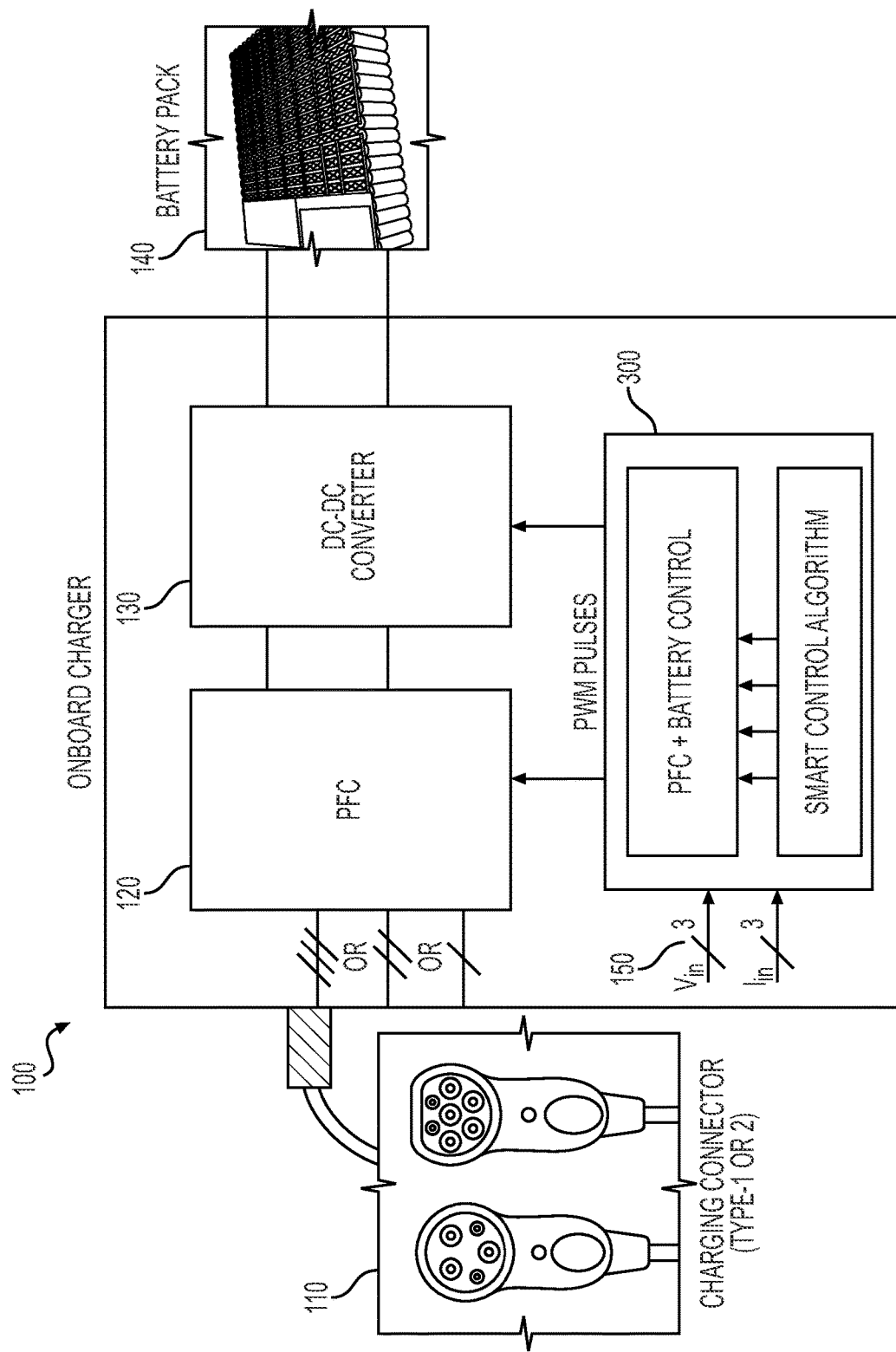
FIG. 1 depicts an exemplary system infrastructure for a battery charger, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

Various embodiments of the present disclosure relate generally to systems and methods for resonant converter thermal and ripple current improvement using two stage voltage loop and, more particularly, to systems and methods for generating a voltage setpoint for a bulk capacitor for a system including a power factor correction (PFC) converter, a high voltage direct current (HVDC) converter, and one or more controllers.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

According to one or more embodiments, a charger may operate with a single-phase or three-phase AC power source. The charger may be designed to support a wide range of HV battery voltage ranges, for example, 400V and 800V systems and maximum output power of 11 kilowatts and 22 kilowatts. A DC-DC Converter with an LLC resonant structure may be used. A PFC converter with a single-phase or three-phase power supply may be employed.

A battery charger according to the disclosure may operate with multiple types of AC input power supplies, including single phase, split/dual/two phase, and three-phase power supplies. The charger may be compatible with a wide range of configuration. An Inductor-Inductor-Capacitor (LLC) converter may be used as a second stage converter using a DC link voltage generated from the PFC as the input voltage for the converter. However, the disclosure is not limited thereto.

The input and output layout of the charger may follow automotive standards. A battery charger according to the disclosure may include a two-stage configuration, including an AC-DC power factor correction converter stage and an isolated DC-DC converter stage. The isolated DC-DC converter may include a full-bridge driver configuration with resonant tank elements to achieve better efficiency. The DC-DC converter may be designed to charge the battery from minimum voltage to maximum voltage.

A battery charger according to the disclosure may operate as a battery charger only, or operate bidirectionally for a charging operation or a power supply operation. The converter may either receive power from an AC power source and provide DC power to a battery, or receive power from the battery and provide power as an AC power source. A vehicle to grid (V2G) configuration may be achieved with a designed control strategy for single-phase, two-phase, and three-phase systems. Switches of the battery charger may be any devices, such as GTO, thyristors, or MOSFETs/IGBTs with series diodes, for example. These switches may also be mechanical components (such as relays or contactors) if sufficient failure rates and arcing conditions during operation are met. Additionally, if the switches are semi-permanent in position, the switches may be implemented as one or more jumper connectors or dual in-line package (DIP) switches.

Electric vehicles, energy storage systems, and backup generators, for example, convert electric power from one form to another. Additionally, an on-board charger for a vehicle, for example, may have a dual purpose. The on-board charger may be a bi-directional system that converts AC voltage to DC voltage in a charging mode (grid-to-battery) and DC voltage to AC voltage in a discharge or inverter mode (battery-to-grid). The charging mode may convert the grid AC into DC voltage to charge the vehicle high voltage (HV) battery, and the discharge or inverter mode may convert the HV battery DC voltage into AC voltage that may be supplied to grid line voltage, be supplied as a backup generator to power a house when the grid is down, or as an inverter to supply voltage to vehicle AC outlets, for example. The on-board charger may have a two-stage design to meet automotive requirements, with an AC-DC power factor converter in a first stage and an isolated DC-DC converter in a second stage.

In the field of battery chargers, a two stage design is generally used for an onboard charger to meet automotive requirements. The configuration layout used in single phase and three phase chargers includes an alternating current (AC) to direct current (DC) power factor correction (PFC) converters at a stage I and an isolated DC-DC converter at stage II. These onboard chargers are expected to meet high power density, with less weight and less volume requirements and therefore, the isolated DC-DC converter should be designed with a small size. The automotive power electronics high voltage (HV) bus requirements are moving from 400V topology to 800V topology for electric vehicles. The power levels are increasing from 11 kW to 22 kW for operation for AC grid conditions. Due to complexity of designs of onboard chargers, the PFC converter and isolated DC-DC converter are designed to meet battery voltage levels and power levels while ensuring thermal and output current requirements for the components, such as switching components.

According to one or more embodiments, a resonant-based DC-DC converter may be used as the stage II converter to meet the performance requirements for a stage II converter in an onboard charger. To maintain a high efficiency of the charger and reduce stress on the switching devices, the isolated DC-DC converter may be operated close to resonant frequency. To operate the resonant converter at resonant frequency, the output voltage of the PFC converter may be controlled to meet the output power command at various battery voltages. Because the output voltage of the PFC converter may have twice AC voltage ripple, one or more embodiments may control the switching frequency of the resonant converter to maintain output current ripple within limits.

In some cases, control of the switching frequency may be complicated at lower output currents, and wide ranging frequency variations may cause thermal runaway issues. A battery charger may be provided as a bi-directional onboard charger. The secondary side of the DC-DC converter may use switches to allow bi-directional power flow. One or more embodiments may control these switches to improve efficiency and thermal performance at higher power levels to improve the quality and performance of the onboard charger.

In some onboard bi-directional charging modules (OBCM), the bulk capacitor may act as a constant voltage source. The isolated DC-DC converter may operate in a variable switching frequency and fixed duty cycle mode. In some isolated DC-DC converters, if the switching frequency moves away from the resonant frequency, then the converter efficiency will be suboptimal. In some isolated DC-DC converters, thermal performance at higher switching frequencies may be poor due to switching losses.

According to one or more embodiments, an onboard charger may operate at varying AC input voltages and varying HV battery voltages, while meeting output power demands and ensuring the output current ripple and thermals are within limits.

According to one or more embodiments, an algorithm may control the ripple current at different output current levels while ensuring the temperature of the switches and resonant components are within limits. To meet output current ripple requirements and thermal limit requirements, the onboard charger may be operated with as described below.

According to one or more embodiments, a resonant converter, such as a LLC resonant converter, may be used as the isolated DC-DC converter in an onboard charger. A PFC converter with single phase or three phase grid conditions may be used as the stage I of the onboard charger. According to one or more embodiments, the switching frequency of the LLC resonant converter may be maintained close to a resonant frequency. To maintain the switching frequency close to the resonant frequency, a voltage setpoint for the bulk capacitor may be controlled to meet the output power demand. According to one or more embodiments, voltage setpoint for the bulk capacitor may be controlled based on current demand of a connected load at low current demands or high current demands.

According to one or more embodiments, for a low current demand of a load connectable to the isolated DC-DC converter, the bulk capacitor voltage may be controlled based on a current based offset control method based on comparisons of the output current through the load to the current demand of the load. During the low current demand, the frequency control of the isolated DC-DC converter may be complicated because the gain of the converter may not vary much with the switching frequency.

According to one or more embodiments, for a low current demand of a load connectable to the isolated DC-DC converter, a compensator that uses the output current error may be used to determine the bulk capacitor voltage setpoint. One or more embodiments may provide an efficient operation by maintaining the switching frequency close to resonant frequency and output current ripple to a minimum.

According to one or more embodiments, for a high current demand of a load connectable to the isolated DC-DC converter, the bulk capacitor voltage may be controlled based on a frequency based offset control method based on maintaining operating frequencies of the isolated DC-DC converter within one or more frequency threshold levels. The frequency based offset control method may enable the isolated DC-DC converter to operate close to resonant frequency for various conditions, which allows thermal limits to be met.

According to one or more embodiments, during high current demand, the isolated DC-DC converter may operate with a variable switching frequency and a fixed duty cycle mode. To ensure switching frequency is close to the resonant frequency, the bulk capacitor voltage setpoint may be varied using switching frequency feedback. This method may ensure that the switching frequency is close to the resonant frequency during operation of the isolated DC-DC converter. This method may allow enough frequency variation to keep the output current ripple to a minimum.

Advantages of the current based offset control method and the frequency based offset control method may include compatibility with various power converters, irrespective of various power converter components, transformer performance, and dynamics associated with resonant converters. According to one or more embodiments, after tuning the controls for an associated hardware, the controls may manage typical changes in resonant tank values and transformer gains and may meet the commanded power demand at varying battery voltage levels.

Advantages of the current based offset control method and the frequency based offset control method may include improving thermal performance, increasing efficiency, and reducing output current ripple of the isolated DC-DC converter in the bi-directional onboard charger. At lower currents, controlling bulk capacitor voltage may reduce output current ripple and improve thermal performance. At high currents, controlling bulk capacitor voltage may improve thermal performance and increase efficiency.

One or more embodiments may improve thermal performance of the isolated DC-DC converter to allow operation of the full operating range (higher output power and currents). One or more embodiments may reduce output current ripple to improve the life of the HV battery.

FIG. 1 depicts an exemplary system infrastructure for a battery charger, according to one or more embodiments. As shown in FIG. 1, a battery charger 100 may include or be electrically connectable to a charging connector 110. The charging connector 110 may provide an electrical connection from an external power supply to the battery charger 100, and may be a Type 1 or a Type 2 connector, for example. The charging connector 110 may transfer single phase, two-phase, or three phase power.

The battery charger 100 may include a Power Factor Correction (PFC) converter 120, an HV DC-DC (HVDC) converter 130, and a controller 300 receiving signals from input sensor 150. Power Factor Correction (PFC) converter 120 may be an AC-DC converter. HVDC converter 130 may be a DC-DC converter. Controller 300 may include one or more controllers. The battery charger 100 may include or be electrically connectable to an HV battery 140. The battery charger 100 may be used in automotive vehicles as an onboard charger to transfer power from an external power source through charging connector 110 to HV battery 140 in a grid-to-battery operation, or to transfer power from HV battery 140 in a vehicle to grid configuration (a battery-to-grid operation). The battery charger 100 may be included in a system provided as an electric vehicle including a motor configured to rotate based on power received from the HV battery 140.

Figure 2:
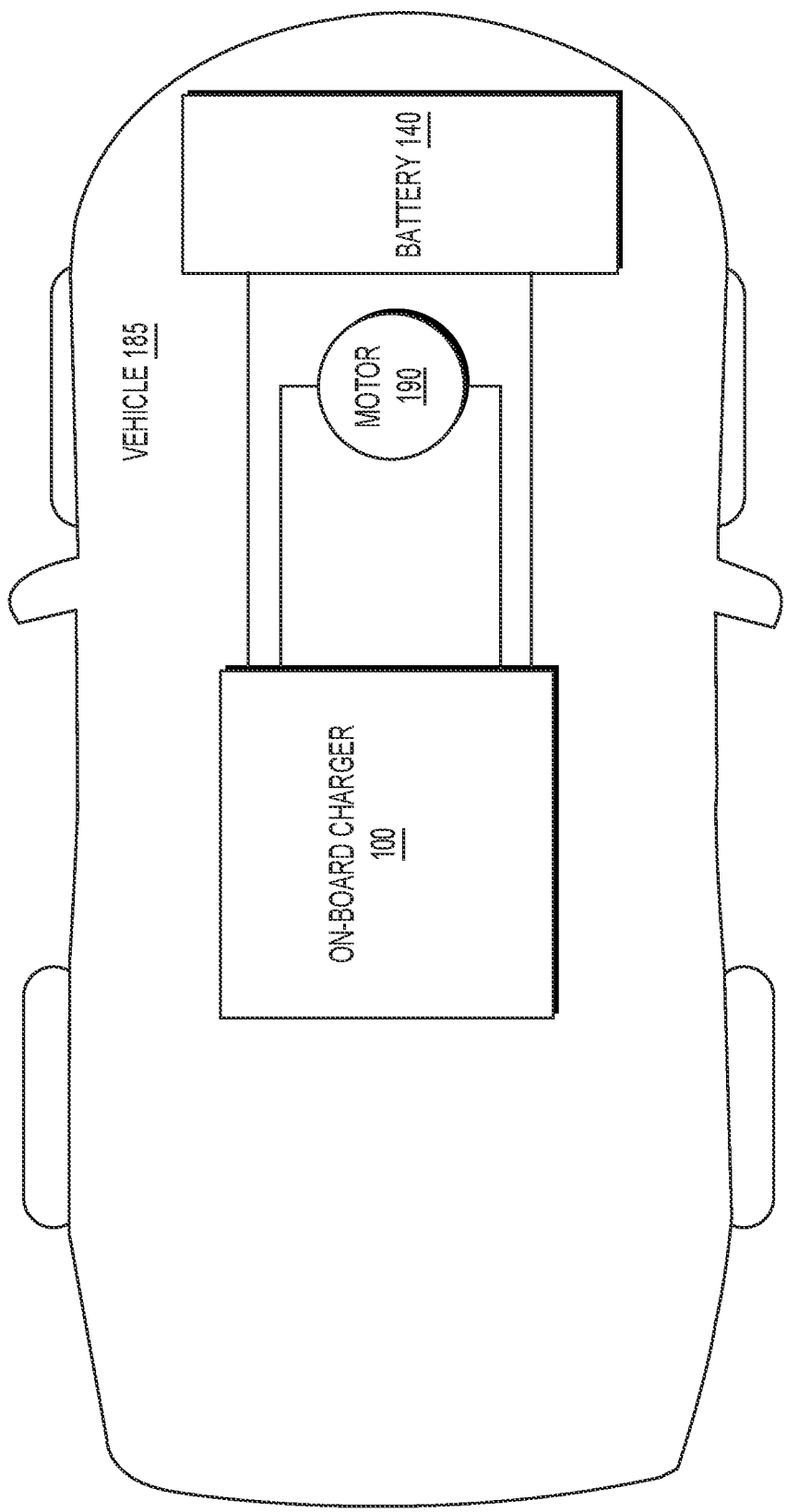
FIG. 2 depicts an exemplary system infrastructure for a vehicle including a battery charger, according to one or more embodiments.

FIG. 2 depicts an exemplary system infrastructure for a vehicle including a battery charger, according to one or more embodiments. The battery charger 100 may be a combined inverter and converter. As shown in FIG. 2, electric vehicle 185 may include battery charger 100, motor 190, and battery 140. Battery charger 100 may include components to receive electrical power from an external source and output electrical power to charge battery 140 of electric vehicle 185. Battery charger 100 may convert DC power from battery 140 in electric vehicle 185 to AC power, to drive motor 190 of the electric vehicle 185, for example, but the embodiments are not limited thereto. Although the motor 190 is depicted in FIG. 2 as being connected to the on-board charger 100, the motor 190 may not need to be connected to the battery charger 100 for operation of the battery charger 100 for providing power to the battery 140. Battery charger 100 may be bi-directional, and may convert DC power to AC power, or convert AC power to DC power, such as during regenerative braking, for example. Battery charger 100 may be a three-phase inverter, a single-phase inverter, or a multi-phase inverter.

Figure 3:
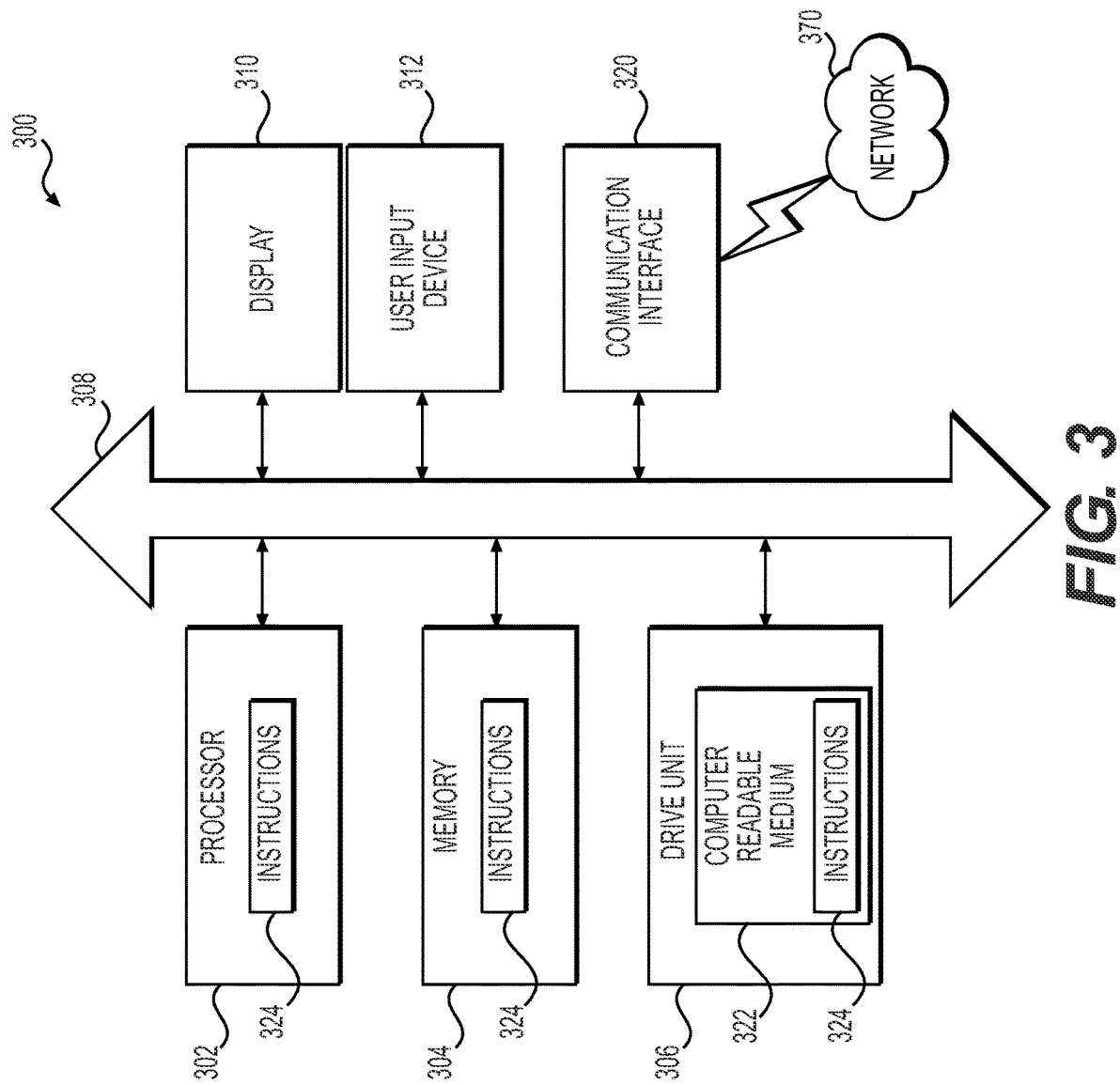
FIG. 3 depicts an implementation of a computer system that may execute techniques presented herein, according to one or more embodiments.

FIG. 3 depicts an implementation of a controller 300 that may execute techniques presented herein, according to one or more embodiments.

Any suitable system infrastructure may be put into place to allow control of the battery charger. FIG. 3 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 3. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The controller 300 may include a set of instructions that can be executed to cause the controller 300 to perform any one or more of the methods or computer-based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the operations of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
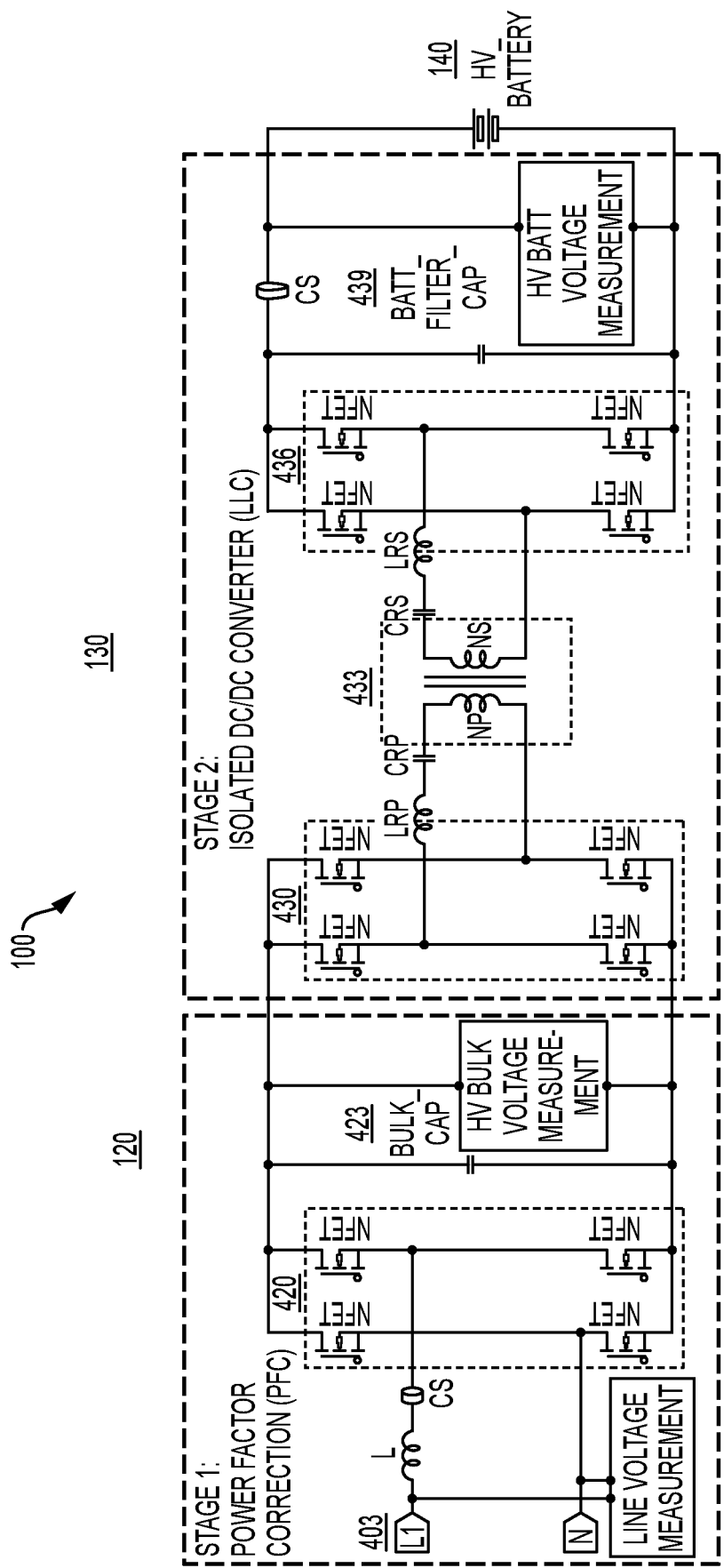
FIG. 4 depicts an exemplary electrical schematic for a single-phase battery charger with a bulk capacitor and a high voltage filter capacitor, according to one or more embodiments.

FIG. 4 depicts an exemplary electrical schematic for a single-phase battery charger with a bulk capacitor and a high voltage filter capacitor, according to one or more embodiments. As shown in FIG. 4, battery charger 100 may include PFC converter 120 and HVDC converter 130. PFC converter 120 may be connected to line voltage 403, which may be a single-phase voltage, for example. HVDC converter 130 may be connected to battery 140. HVDC converter 130 may be operable to isolate PFC converter 120 from HV battery 140. For example, HVDC converter 130 may be a CLLLC converter, or any suitable DC-DC converter.

PFC converter 120 may include PFC converter switch 420 and bulk capacitor 423. PFC converter switch 420 may be one or more switches, such as four NFET switches, for example, as shown in FIG. 4. PFC converter 120 may include other components, such as inductor L, AC line current sensor CS, line voltage detector, and bulk capacitor voltage detector, for example.

HVDC converter 130 may include bridge driver switch 430, one or more transformers 433, bridge rectifier switch 436, and HV filter capacitor 439. The bridge driver switch 630 and the bridge rectifier switch 636 may be embodied as metal oxide semiconductor field effect transistors (MOSFETs), such as silicon carbide (SIC) MOSFETs. Bridge driver switch 430 may be one or more switches, such as four NFET switches, for example, as shown in FIG. 4. Bridge rectifier switch 436 may be one or more switches, such as four NFET switches, for example, as shown in FIG. 4. PFC converter 120 may include other components, such as primary side inductor LRP, secondary side inductor LRS, primary side capacitor CRP, secondary side capacitor CRS, CS, and battery voltage detector, for example.

The battery charger 100 may operate bi-directionally. A vehicle to grid (V2G) configuration may be achieved with a designed control strategy for multiple voltages. The PFC converter 120 may be configured to receive DC power from HV battery 140 through HVDC converter 130, convert the DC power to AC power, and provide the AC power as an output to line voltage 403. The controller 300 may be designed with an algorithm to control an operation of the PFC converter 120 and HVDC converter 130.

In grid to vehicle (G2V) operation, bridge driver switch 430 may be operated as a full bridge driver or a half bridge driver, and transmit power as a square-wave signal from PFC converter 120 to one or more transformers 433. One or more transformers 433 may be one or more high-frequency transformers and may be a single transformer with multiple coils or windings, multiple transformers with single coils or windings, or any combination thereof. One or more transformers 433 may be connected to bridge rectifier switch 436. Bridge rectifier switch 436 may convert the square-wave signal to DC power.

Controller 300 may be designed with and/or configured to execute an algorithm for control of the PFC converter switch 420, bridge driver switch 430, and bridge rectifier switch 436.

Figure 5:
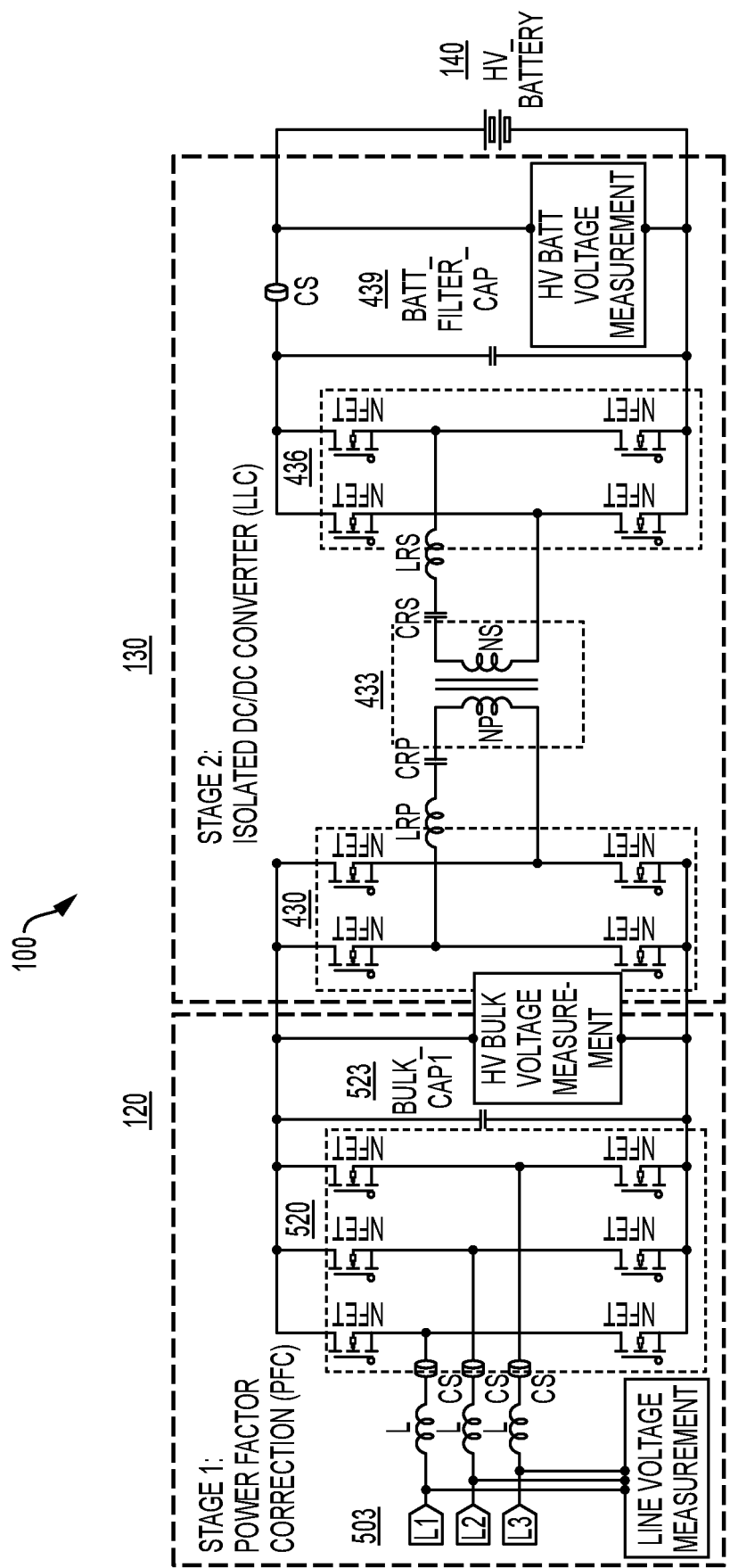
FIG. 5 depicts an exemplary electrical schematic for a three-phase battery charger with a bulk capacitor and a high voltage filter capacitor, according to one or more embodiments.

FIG. 5 depicts an exemplary electrical schematic for a three-phase battery charger with a bulk capacitor and a high voltage filter capacitor, according to one or more embodiments.

As shown in FIG. 5, battery charger 100 may include PFC converter 120 and HVDC converter 130. PFC converter 120 may be connected to line voltage 503, which may be a three-phase voltage, for example. HVDC converter 130 may be connected to battery 140. HVDC converter 130 may be operable to isolate PFC converter 120 from HV battery 140. For example, HVDC converter 130 may be a CLLLC converter, or any suitable DC-DC converter.

PFC converter 120 may include PFC converter switch 520 and bulk capacitor 523. PFC converter switch 520 may be one or more switches, such as six NFET switches, for example, as shown in FIG. 5. PFC converter 120 may include other components, such as an inductor L and CS for each input phase, line voltage detector, and bulk capacitor voltage detector, for example.

HVDC converter 130 may include bridge driver switch 430, one or more transformers 433, bridge rectifier switch 436, and HV filter capacitor 439. Bridge driver switch 430 may be one or more switches, such as four NFET switches, for example, as shown in FIG. 5. Bridge rectifier switch 436 may be one or more switches, such as four NFET switches, for example, as shown in FIG. 5. PFC converter 120 may include other components, such as primary side inductor LRP, secondary side inductor LRS, primary side capacitor CRP, secondary side capacitor CRS, CS, and battery voltage detector, for example.

The battery charger 100 may operate bi-directionally. A vehicle to grid (V2G) configuration may be achieved with a designed control strategy for multiple voltages. The PFC converter 120 may be configured to receive DC power from HV battery 140 through HVDC converter 130, convert the DC power to AC power, and provide the AC power as an output to line voltage 503. The controller 300 may be designed with an algorithm to control an operation of the PFC converter 120 and HVDC converter 130.

In grid to vehicle (G2V) operation, bridge driver switch 430 may be operated as a full bridge driver or a half bridge driver, and transmit power as a square-wave signal from PFC converter 120 to one or more transformers 433. One or more transformers 433 may be one or more high-frequency transformers and may be a single transformer with multiple coils or windings, multiple transformers with single coils or windings, or any combination thereof. One or more transformers 433 may be connected to bridge rectifier switch 436. Bridge rectifier switch 436 may convert the square-wave signal to DC power.

Controller 300 may be designed with and/or configured to execute an algorithm for control of the PFC converter switch 520, bridge driver switch 430, and bridge rectifier switch 436.

Figure 6:
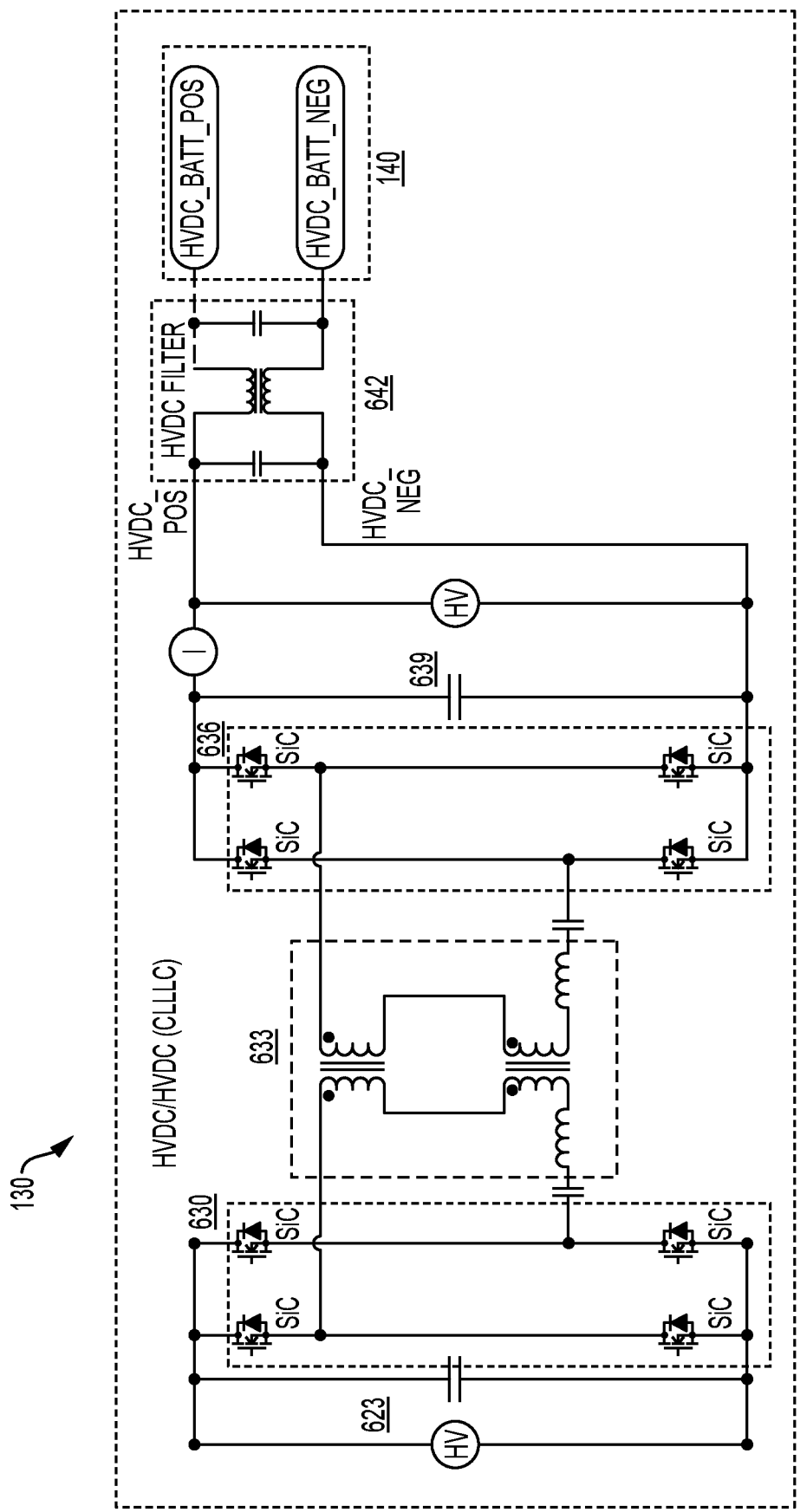
FIG. 6 depicts an exemplary electrical schematic of a HVDC converter, according to one or more embodiments.

FIG. 6 depicts an exemplary electrical schematic of a HVDC converter 130 in accordance with one or more embodiments described herein. The HVDC converter 130 described with respect to FIG. 6 may connect to the PFC converter 120 and the battery 140 shown in FIGS. 4 and 5 for use in the battery charger 100. The HVDC converter 130 may isolate the PFC converter 120 from the battery 140 and may be used for the bi-directional power flow operation for the battery charger 100.

The HVDC converter 130 may include a bridge driver switch 630, one or more transformers 633, a bridge rectifier switch 636, a HV filter capacitor 639, and HVDC filter 642. The bridge driver switch 630 and the bridge rectifier switch 636 may be embodied as metal oxide semiconductor field effect transistors (MOSFETs), such as silicon carbide (SiC) MOSFETs. The bridge driver switch 630 may be one or more switches, such as four NFET switches, for example, as shown in FIG. 6. The bridge rectifier switch 636 may be one or more switches, such as four NFET switches, for example, as shown in FIG. 6. The bridge rectifier switch 636 may be connected to a secondary side of the one or more transformers 633 and may enable the bi-directional operation of the HVDC converter 130.

Bulk capacitor 623 may be connected to the HVDC converter 130. In one or more embodiments, the bulk capacitor 623 may be configured to provide a reservoir of energy to smooth out the output voltage and current of the PFC converter 120. For example, the PFC converter 120 may take in AC input voltage from the line voltage 403 or 503, and convert the AC voltage to a high-voltage DC output. However, the high-voltage DC output and current may have ripple and fluctuations due to the nature of AC power. The bulk capacitor 623, which may be connected to the PFC converter 120, may help to stabilize the output current and voltage by absorbing and discharging excess energy during times of high demand or low supply.

The output of the PFC converter 120 may be smoothed and stabilized by the bulk capacitor 623. The output of the PFC converter 120 may be fed into the HVDC converter 130 during operation. The HVDC converter 130 may convert DC input from the PFC converter 120 to a voltage suitable for charging the battery 140 of the electric vehicle 185. The bulk capacitor 623 may also be responsible for smoothing the output of the HVDC converter 130 before being delivered to the battery 140. The HVDC filter 642 may work in conjunction with the bulk capacitor to smooth the output of the HVDC converter 130.

The bridge driver switch 630 may be operated as a full bridge driver or a half bridge driver, and transmit power as a square-wave signal from the PFC converter 120 to the one or more transformers 633. The one or more transformers 633 may be one or more high-frequency transformers and may be a single transformer with multiple coils or windings, multiple transformers with single coils or windings, or any combination thereof. The one or more transformers 633 may be connected to the bridge rectifier switch 636. The bridge rectifier switch 636 may convert the square-wave signal to DC power. HVDC converter 130 may maintain the switching frequency the HVDC converter 130 close to resonant frequency, based on control of the bridge driver switch 630, the bridge rectifier switch 636, or both the bridge driver switch 630 and the bridge rectifier switch 636 for stable and efficient operation of the battery charger 100.

According to one or more embodiments, voltage control for the bulk capacitor 623 based on a generated voltage setpoint may enable the switching frequency of the HVDC converter 130 to be close to the resonant frequency during operation. Generating a voltage setpoint for the bulk capacitor 623 may be determined based on either a low current demand operation of a connected load or a high current demand operation of a connected load. The algorithm and methods for generating the voltage setpoint for the bulk capacitor 623 are discussed in detail with respect to FIGS. 7-10.

Figure 7:
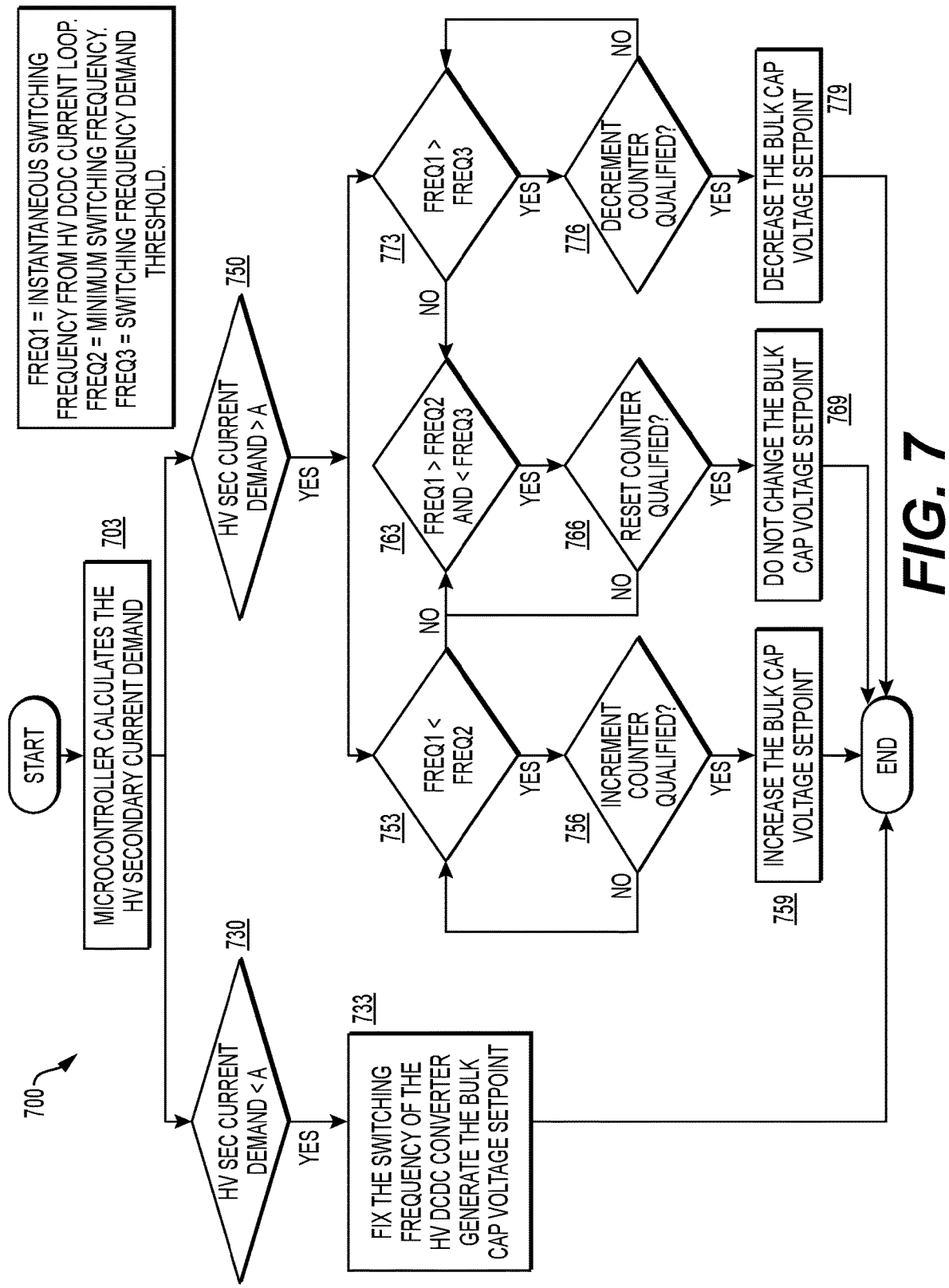
FIG. 7 depicts an exemplary method for generating a voltage setpoint for a bulk capacitor, according to one or more embodiments.

FIG. 7 depicts an exemplary method 700 for generating a voltage setpoint for a bulk capacitor, such as the bulk capacitor 423, the bulk capacitor 523, or the bulk capacitor 623, for example, according to one or more embodiments. The method 700 may be implemented by the controller 300, which is described with respect to FIG. 3. At operation 703, the controller 300 may be configured to calculate or determine a current demand of a load connected to the HVDC converter 130, described with respect to FIGS. 4-6. The load may be a battery such as the battery 140.

The current demand of the battery 140 may be associated with an amount of current required by the battery 140 during charging or discharging. For example, the amount of current required may vary depending on charging ability of the battery 140, such as the charging rate. The charging rate may be determined by a variety of factors, such as the capacity of the battery 140 and the charging rate specified by the manufacturer. Other factors may influence the charging rate of the battery 140, such as the state of charge of the battery 140, the temperature of the battery 140, age of the battery 140, power requirements of the vehicle 185 and the motor 190, and circuit topologies of the PFC converter 120, the HVDC converter 130, and/or the AC grid, among others. Efficiency of the battery charger 100 may also impact the current demand. The current demand may vary depending on the amount of current the battery 140 needs to be charged to a desired level, accounting for the charging rate. In some cases, a user may specify or adjust the charging rate depending on preference and/or system limitations. The current demand of the battery 140 may be calculated or determined by the controller 300. After operation 703, the method 700 moves to operations 730 and 750.

At operation 730, the controller 300 may be configured to compare the current demand to one or more thresholds. The one or more thresholds, such as one or more current demand thresholds "A," may be predetermined and may include a low current demand threshold or a high current demand threshold. The one or more thresholds may include a low current demand threshold 812 and a high current demand threshold 809, for example, which are described in detail with respect to FIG. 8. If the current demand is less than or equal to a low current demand threshold, the current demand may be determined to have a low current demand. Thereafter, the method 700 moves to operation 733.

At operation 733, the method 700 performs a current based offset control method to generate a voltage setpoint for the bulk capacitor 423, the bulk capacitor 523, or the bulk capacitor 623, for example. The current based offset control method may include receiving a measurement of actual current being supplied to the battery 140 for one or more charging cycles for the battery 140. The actual current measurement may include a load current measurement and may be an amount of current being supplied to the battery 140 by the battery charger 100 during operation. The current demand and the actual current may not be the same, as the battery charger 100 and the associated components (the PFC converter 120, the HVDC converter 130) may not be able to supply the full current demanded by the battery 140 due to limitations in the circuit or the power source. Thereafter, the portion of the method 700 ends. Further aspects of the current based offset control method are described with respect to FIG. 9.

At operation 750, the controller 300 may be configured to compare the current demand to one or more thresholds. The one or more thresholds, such as one or more current demand thresholds "A," may be predetermined and may include a low current demand threshold or a high current demand threshold. The one or more thresholds may include a low current demand threshold 812 and a high current demand threshold 809, for example, which are described in detail with respect to FIG. 8. If the current demand is greater than or equal to a high current demand threshold, the current demand may be determined to have a high current demand, and the method 700 moves to operation 753, 763, or 773 to perform a frequency based offset control method to generate or adjust a voltage setpoint for the bulk capacitor 423, the bulk capacitor 523, and/or the bulk capacitor 623.

At operations 753, 763, and 773, the controller 300 may determine a switching frequency (FREQ1) of the HVDC converter 130 during one or more charging cycles of the battery 140. The switching frequency may include an instantaneous switching frequency for one or more switches of the bridge driver switch 630 and/or the bridge rectifier switch 636. The switching frequency may be compared to a minimum switching frequency threshold (FREQ2) or a switching frequency demand threshold (FREQ3) of the HVDC converter 130.

At operation 753, the controller 300 may be configured to compare the switching frequency (FREQ1) of the HVDC converter 130 to the minimum switching frequency threshold (FREQ2) of the HVDC converter 130. The minimum switching frequency threshold (FREQ2) may be a predetermined number set by the user depending on the application for use of the battery charger 100. The minimum switching frequency threshold (FREQ2) may include a value less than the resonant frequency of the HVDC converter 130. The HVDC converter 130 may be configured to operate with a frequency close to the resonant frequency. The minimum switching frequency threshold (FREQ2) may include a value slightly greater than a minimum operating frequency of the HVDC converter 130 so that the HVDC converter 130 may be configured to avoid open loop operation while meeting the current demand. If the switching frequency (FREQ1) is less than the minimum switching frequency threshold (FREQ2), the method 700 moves to operation 756. If the switching frequency (FREQ1) is not less than the minimum switching frequency threshold (FREQ2), the method 700 moves to operation 763.

At operation 756, controller 300 may determine whether an increment counter threshold has been reached. The increment counter threshold may confirm that a frequency is greater than a threshold for a threshold number of samples. If the increment counter threshold has not been reached, method 700 may return to operation 753. If the increment counter threshold has been reached, method 700 may progress to operation 759.

At operation 759, the controller 300 may be configured to increase a voltage setpoint for the bulk capacitor 423, the bulk capacitor 523, and/or the bulk capacitor 623. The voltage setpoint may be increased until the switching frequency (FREQ1) of the HVDC converter 130 adjusts to a value between the minimum switching frequency threshold (FREQ2) and the switching frequency demand threshold (FREQ3). Maintaining the switching frequency (FREQ1) of the HVDC converter 130 close to the resonant frequency of the HVDC converter 130 may enable efficient operation of the battery charger 100, reduce output current ripple of the HVDC converter 130, and improve thermals of the switching components of the HVDC converter 130. Thereafter, this portion of the method 700 ends.

At operation 773, the controller 300 may be configured to compare the switching frequency (FREQ1) of the HVDC converter 130 to a switching frequency demand threshold (FREQ3) of the HVDC converter 130. The switching frequency demand threshold (FREQ3) may be a predetermined number set by the user depending on the application for use of the battery charger 100. The switching frequency demand threshold (FREQ3) may be selected as a maximum resonant frequency based on test conditions considering component variation. The switching frequency demand threshold (FREQ3) may include a value greater than the resonant frequency of the HVDC converter 130. If the switching frequency (FREQ1) is greater than the switching frequency demand threshold, the method 700 moves to operation 776. If the switching frequency (FREQ1) is not greater than the minimum switching frequency threshold (FREQ2), the method 700 moves to operation 763.

At operation 776, controller 300 may determine whether a decrement counter threshold has been reached. If the decrement counter threshold has not been reached, method 700 may return to operation 773. If the decrement counter threshold has been reached, method 700 may progress to operation 779.

At operation 779, the controller 300 may be configured to decrease a voltage setpoint for the bulk capacitor 423, the bulk capacitor 523, and/or the bulk capacitor 623. The voltage setpoint may be decreased until the switching frequency (FREQ1) of the HVDC converter 130 adjusts to a value between the minimum switching frequency threshold (FREQ2) and the switching frequency demand threshold (FREQ3). The minimum switching frequency threshold (FREQ2) and the switching frequency demand threshold (FREQ3) may be used to create a band around the resonant frequency (e.g., ideal resonant frequency of the HVDC converter 130). The controller 300 may be configured to maintain the switching frequency (FREQ1) of the HVDC converter 130 within the band close to the resonant frequency of the HVDC converter 130 to enable efficient operation of the battery charger 100, reduce output current ripple of the HVDC converter 130, and improve thermals of the switching components of the HVDC converter 130. Thereafter, this portion of the method 700 ends.

At operation 763, controller 300 may compare the switching frequency (FREQ1) to both the minimum switching frequency threshold (FREQ1) and the switching frequency demand threshold (FREQ3) of the HVDC converter 130. If the switching frequency (FREQ1) is between the minimum switching frequency threshold (FREQ2) and the switching frequency demand threshold (FREQ3), the method 700 moves to operation 766.

At operation 766, controller 300 may determine whether a reset counter threshold has been reached. The reset counter threshold may confirm that a frequency is within a threshold for a threshold number of samples. If the reset counter threshold has not been reached, method 700 may return to operation 763. If the reset counter threshold has been reached, method 700 may progress to operation 769.

At operation 769, the controller 300 may not change the voltage setpoint for the bulk capacitor 423, the bulk capacitor 523, and/or the bulk capacitor 623. The switching frequency (FREQ1) is already between the minimum switching frequency threshold (FREQ2) and the switching frequency demand threshold (FREQ3) of the HVDC converter 130, and thus, does not need to be adjusted by changing the voltage setpoint of the bulk capacitor 423, the bulk capacitor 523, and/or the bulk capacitor 623. Thereafter, this portion of the method 700 ends.

Figure 8:
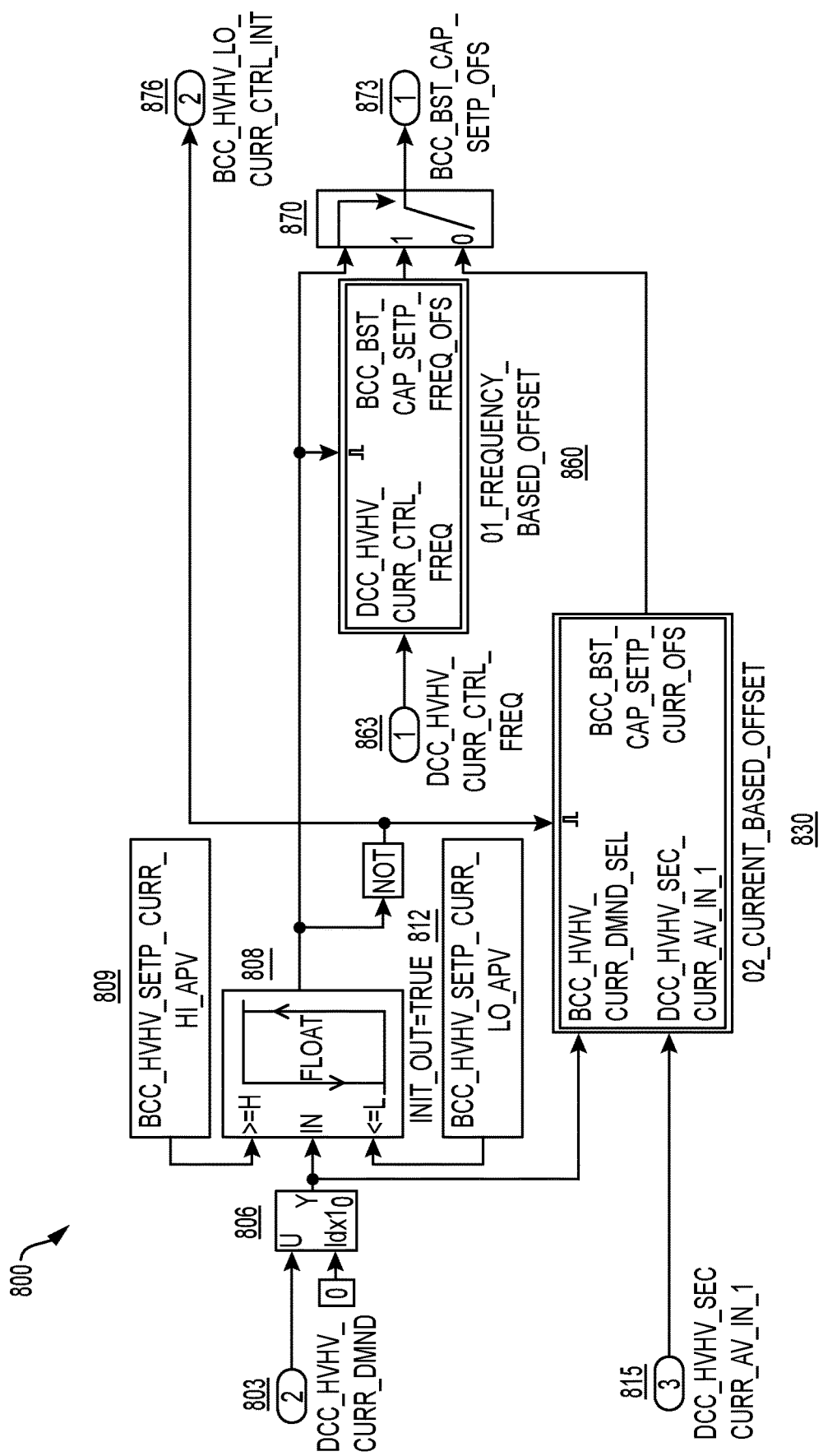
FIG. 8 depicts an exemplary control logic schematic for a battery charger, according to one or more embodiments.

FIG. 8 depicts an exemplary control logic schematic 800 for a battery charger, according to one or more embodiments. The control logic schematic 800 may correspond to logic implementations of the various operations performed according to the method 700. Accordingly, many of the components and elements described with respect to the method 700 may correspond to similar elements and components that will be described with respect to the control logic schematic 800.

The control logic schematic 800 may include an index module 806, a comparator module 808, a current based offset module 830, a frequency based offset module 860, and a voltage setpoint module 870. The control logic schematic 800, similar to the method 700, may determine a current demand of a load connected to the HVDC converter 130. For example, current demand 803 may be fed as an input into the index module 806, and the output of the index module 806 may be fed into the comparator module 808 as an input. At the comparator module 808, the output of the index module 806 may be compared to a low current demand threshold 812 or a high current demand threshold 809. If the current demand 803 is determined to be less than or equal to the low current demand threshold 812, the logic flow of control logic schematic 800 may move to the current based offset module 830. If the current demand 803 is determined to be greater than or equal to the high current demand threshold 809, the logic flow of control logic schematic 800 may move to the frequency based offset module 860.

The current based offset module 830 may be configured to generate a voltage setpoint for the bulk capacitor 423, the bulk capacitor 523, and the bulk capacitor 623, as examples. For example, the current based offset module 830 may implement the current based offset control method described with respect to FIG. 7, which includes receiving an actual current 815 being fed to the battery 140 for one or more charging cycles for the battery 140. The actual current 815 may include a load current measurement and may be an amount of current being supplied to the battery 140 by the battery charger 100 during operation. The current demand 803 and the actual current 815 may not be the same, as the battery charger 100 and the associated components (the PFC converter 120, the HVDC converter 130) may not be able to supply the full current demanded by the battery 140 due to limitations in the circuit or the power source.

The current based offset module 830 may perform a comparison between the actual current 815 being supplied to the battery 140 and the current demand 803 of the battery 140 determined by the controller 300. The current demand 803 may be supplied to the current based offset module 830 as a portion of the output of the index module 806. An output current error may be generated based on the comparison. The output current error may be fed into the voltage setpoint module 870 as an input. An output of the voltage setpoint module 870 may be adjusted based on a previously existing bulk capacitor voltage setpoint to generate a final voltage setpoint 873 for the bulk capacitor 423, the bulk capacitor 523, and/or the bulk capacitor 623. Further aspects of the current based offset module 830 are described with respect to FIG. 9. The controller 300 may be configured to perform debugging operations for the current based offset module 830 based on output signal 876.

The frequency based offset module 860 may be configured to generate or adjust a voltage setpoint for the bulk capacitor 423, the bulk capacitor 523, and/or the bulk capacitor 623. The frequency based offset module 860 may be configured to implement the frequency based offset control method described with respect to FIG. 7, which includes determining a switching frequency 863 of the HVDC converter 130 during one or more charging cycles of the battery 140. The switching frequency 863 may include an instantaneous switching frequency for one or more switches of the bridge driver switch 630 and/or the bridge rectifier switch 636. The switching frequency 863 may be compared to a minimum switching frequency threshold or a switching frequency demand threshold of the HVDC converter 130.

The minimum switching frequency threshold may be a predetermined number set by the user depending on the application for use of the battery charger 100. The minimum switching frequency threshold may include a value less than the resonant frequency of the HVDC converter 130. The HVDC converter 130 may be configured to operate with a frequency close to the resonant frequency. The minimum switching frequency threshold may include a value slightly greater than a minimum operating frequency of the HVDC converter 130 so that the HVDC converter 130 may be configured to avoid open loop operation while meeting the current demand. If the switching frequency 863 is less than the minimum switching frequency threshold, the frequency based offset module 860 may increase a voltage setpoint for the bulk capacitor 423, the bulk capacitor 523, and/or the bulk capacitor 623 until the switching frequency of the HVDC converter 130 adjusts to a value between the minimum switching frequency threshold and the switching frequency demand threshold.

The switching frequency demand threshold may include a value greater than the resonant frequency of the HVDC converter 130. The switching frequency demand threshold may be a predetermined number set by the user depending on the application for use of the battery charger 100. The switching frequency demand threshold may be selected as a maximum resonant frequency based on test conditions considering component variation. If the switching frequency 863 is greater than the switching frequency demand threshold, the frequency based offset module 860 may decrease a voltage setpoint for the bulk capacitor 423, the bulk capacitor 523, and/or the bulk capacitor 623 until the switching frequency 863 of the HVDC converter 130 adjusts to a value between the minimum switching frequency threshold and the switching frequency demand threshold. The minimum switching frequency threshold and the switching frequency demand threshold may be used to create a band around the resonant frequency (e.g., ideal resonant frequency of the HVDC converter 130). The controller 300 may be configured to maintain the switching frequency of the HVDC converter 130 within the band close to the resonant frequency of the HVDC converter 130 to enable efficient operation of the battery charger 100, reduce output current ripple of the HVDC converter 130, and improve thermals of the switching components of the HVDC converter 130.

If the switching frequency 863 is between the minimum switching frequency threshold and the switching frequency demand threshold, the frequency based offset module 860 may not change the voltage setpoint for the bulk capacitor 423, the bulk capacitor 523, and/or the bulk capacitor 623.

The output of the current based offset module 830 and the output of the frequency based offset module 860 may be fed as inputs to voltage setpoint module 870. The voltage setpoint module 870 may be configured to select a voltage setpoint 873 for the bulk capacitor 423, the bulk capacitor 523, and/or the bulk capacitor 623 depending on if the current based offset module 830 was used or if the frequency based offset module 860 was used to generate the voltage setpoint for the bulk capacitor 423, the bulk capacitor 523, and/or the bulk capacitor 623. Further aspects of the frequency based offset module 860 are described with respect to FIG. 10.

Figure 9:
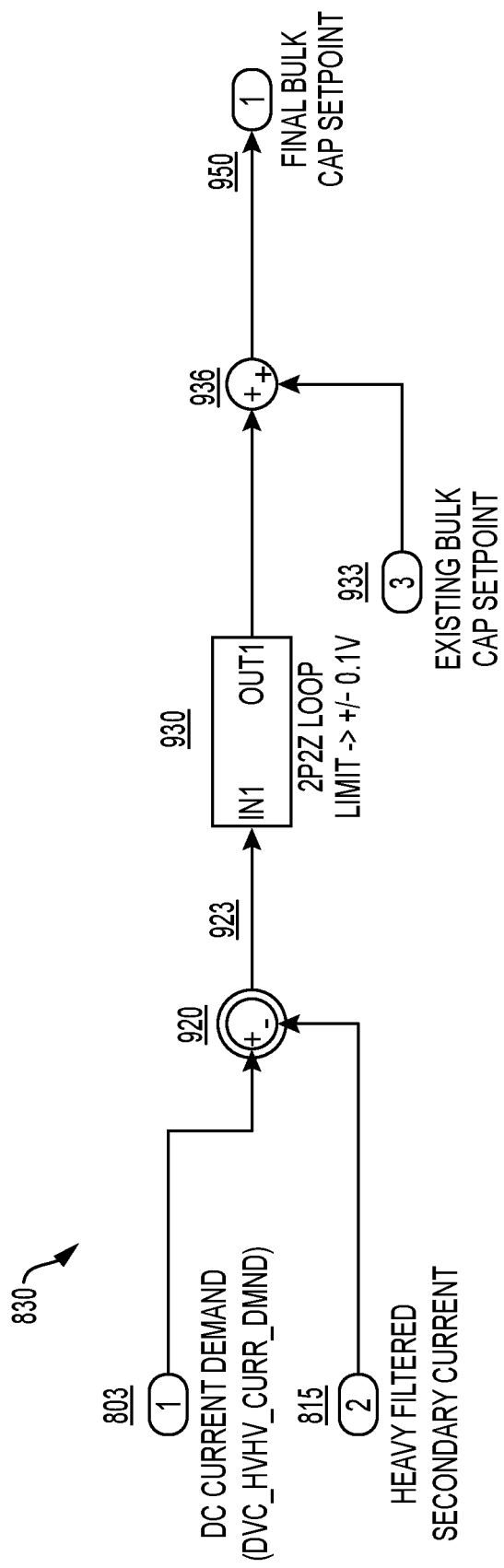
FIG. 9 depicts an exemplary control logic schematic of the current based offset module depicted in FIG. 8, according to one or more embodiments.

FIG. 9 depicts an exemplary control logic schematic of the current based offset module 830 depicted in FIG. 8 in accordance with various embodiments described herein. The control logic schematic may include a first summing point 920, a compensator 930, and a second summing point 936. The current based offset module 830 may be configured to generate a voltage setpoint 950 for the bulk capacitor 423, the bulk capacitor 523, and the bulk capacitor 623, as examples. The current based offset module 830 may implement the current based offset control method described with respect to FIG. 7, which includes receiving or determining an actual current 815 being fed to the battery 140 for one or more charging cycles for the battery 140. The actual current 815 may include a load current measurement and may be an amount of current being supplied to the battery 140 by the battery charger 100 during operation. Current demand 803 and the actual current 815 may not be the same, as the battery charger 100 and the associated components (the PFC converter 120, the HVDC converter 130) may not be able to supply the full current demanded by the battery 140 due to limitations in the circuit or the power source.

The current based offset module 830 may perform a comparison between the actual current 815 being supplied to the battery 140 and the current demand 803 through the summing point 920. The first summing point 920 may be a comparator element used for negative feedback, which may be configured to determine a difference between the current demand 803 and the actual current 815. An output current error 923 may be generated based on the difference. The output current error 923 may be fed into the compensator 930 as an input. An output of the compensator 930 may be fed as an input to the second summing point 936. A previously existing voltage setpoint 933 of the bulk capacitor 423, the bulk capacitor 523, and/or the bulk capacitor 623 may be fed as an input to the second summing point 936. The second summing point 936 may be a summer element used for positive feedback. A final voltage setpoint 950 for the bulk capacitor 423, the bulk capacitor 523, and/or the bulk capacitor 623 may be generated as an output of the second summing point 936. The final voltage setpoint 950 may include a summation of the output of the compensator 930 and the previously existing voltage setpoint 933.

Figure 10:
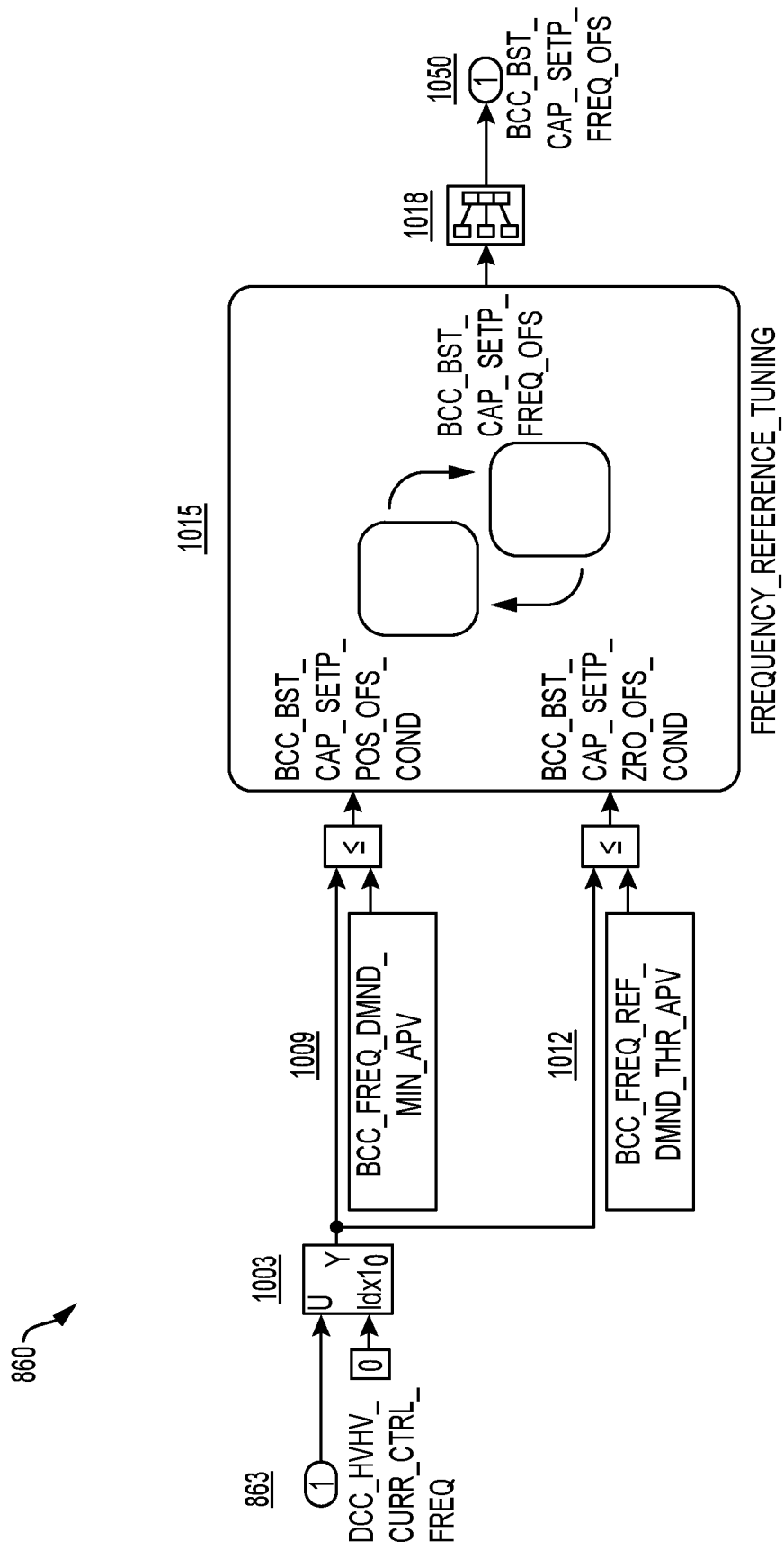
FIG. 10 depicts an exemplary control logic schematic of the frequency based offset module depicted in FIG. 8, according to one or more embodiments.

FIG. 10 depicts an exemplary control logic schematic of the frequency based offset module 860 depicted in FIG. 8 in accordance with various embodiments described herein. The control logic schematic may include an index module 1003, a frequency tuning module 1015, and a voltage setpoint adjuster module 1018. The frequency based offset module 860 may be configured to generate or adjust a voltage setpoint for the bulk capacitor 423, the bulk capacitor 523, and/or the bulk capacitor 623. The frequency based offset module 860 may be configured to implement the frequency based offset control method described with respect to FIG. 7, which includes determining a switching frequency 863 of the HVDC converter 130 during one or more charging cycles of the battery 140.

The switching frequency 863 may include an instantaneous switching frequency for one or more switches of the bridge driver switch 630 and/or the bridge rectifier switch 636. The switching frequency 863, as an output to the index module 1003, may be compared to a minimum switching frequency threshold 1009 or a switching frequency demand threshold 1012 of the HVDC converter 130.

The minimum switching frequency threshold 1009 may be a predetermined number set by the user depending on the application for use of the battery charger 100. The minimum switching frequency threshold 1009 may include a value less than the resonant frequency of the HVDC converter 130. The HVDC converter 130 may be configured to operate with a frequency close to the resonant frequency. The minimum switching frequency threshold 1009 may include a value slightly greater than a minimum operating frequency of the HVDC converter 130 so that the HVDC converter 130 may be configured to avoid open loop operation while meeting the current demand.

The frequency tuning module 1015 may continuously compare the switching frequency 863 to the minimum switching frequency threshold 1009 or the switching frequency demand threshold 1012 If the switching frequency 863 is less than the minimum switching frequency threshold, the voltage setpoint adjuster module 1018 may increase a voltage setpoint 1050 for the bulk capacitor 423, the bulk capacitor 523, and/or the bulk capacitor 623 until the switching frequency 863 of the HVDC converter 130 adjusts to a value between the minimum switching frequency threshold 1009 and the switching frequency demand threshold 1012.

The switching frequency demand threshold 1012 may include a value greater than the resonant frequency of the HVDC converter 130. The switching frequency demand threshold 1012 may be a predetermined number set by the user depending on the application for use of the battery charger 100. The switching frequency demand threshold 1012 may be selected as a maximum resonant frequency based on test conditions considering component variation. If the switching frequency 863 is greater than the switching frequency demand threshold 1012, the voltage setpoint adjuster module 1018 may decrease the voltage setpoint 1050 for the bulk capacitor 423, the bulk capacitor 523, and/or the bulk capacitor 623 until the switching frequency 863 of the HVDC converter 130 adjusts to a value between the minimum switching frequency threshold 1009 and the switching frequency demand threshold 1012. The minimum switching frequency threshold 1009 and the switching frequency demand threshold 1012 may be used to create a band around the resonant frequency (e.g., ideal resonant frequency of the HVDC converter 130). The controller 300 may be configured to maintain the switching frequency of the HVDC converter 130 within the band close to the resonant frequency of the HVDC converter 130 to enable efficient operation of the battery charger 100, reduce output current ripple of the HVDC converter 130, and improve thermals of the switching components of the HVDC converter 130.

If the switching frequency 863 is between the minimum switching frequency threshold 1009 and the switching frequency demand threshold 1012, the frequency based offset module 860 may not change the voltage setpoint 1050 for the bulk capacitor 423, the bulk capacitor 523, and/or the bulk capacitor 623.

The frequency based offset module 860 may be implemented during periods of high current demand, where the HVDC converter 130 is configured to operate with a variable switching frequency and fixed duty cycle mode. To ensure the switching frequency 863 is close to the resonant frequency, the voltage setpoint for the bulk capacitor 423, the bulk capacitor 523, and/or the bulk capacitor 623 may be varied using switching frequency feedback. This method may ensure that the switching frequency 863 is maintained close to the resonant frequency for the operation of the battery charger 100. This method may vary frequency variation to reduce output current ripple.

According to one or more embodiments, voltage setpoint for a bulk capacitor may be controlled based on current demand of a connected load at low current demands or high current demands.

According to one or more embodiments, for a low current demand of a load connectable to the isolated DC-DC converter, a current based offset control method may be used to determine a voltage setpoint of a bulk capacitor. Such method may ensure efficient operation since the switching frequency is kept close to resonant frequency and keeps output current ripple to a minimum.

According to one or more embodiments, for a high current demand of a load connectable to the isolated DC-DC converter, a frequency based offset control method may be used to determine a voltage setpoint of a bulk capacitor. The frequency based offset control method may enable the isolated DC-DC converter to operate close to the resonant frequency for various conditions, which allows thermal limits to be met. This method may ensure that the switching frequency operates close to the resonant frequency during operation of the isolated DC-DC converter. This method may allow enough frequency variation to keep the output current ripple to a minimum.

Advantages of the current based offset control method and the frequency based offset control method include compatibility with various power converters, irrespective of various power converter components, transformer performance, and dynamics associated with resonant converters. According to one or more embodiments, after tuning the controls for an associated hardware, the controls may manage typical changes in resonant tank values and transformer gains and may meet the commanded power demand at varying battery voltage levels.

Advantages of the current based offset control method and the frequency based offset control method include improving thermal performance, increasing efficiency, and reducing output current ripple of the isolated DC-DC converter in the bi-directional onboard charger. At lower currents, controlling bulk capacitor voltage may reduce output current ripple and improve thermal performance. At high currents, controlling bulk capacitor voltage may improve thermal performance and increase efficiency.

Improved thermal performance of the isolated DC-DC converter may allow operation at the full operating range (higher output power and currents). Reducing output current ripple may improve the life of the HV battery.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:
   an alternating current (AC) to direct current (DC) converter (AC-DC converter), the AC-DC converter including a bulk capacitor;
   a DC-DC converter connectable to the AC-DC converter; and
   one or more controllers configured to control the system by performing operations, the operations including:
      determining a current demand of a load, the load being connectable to the DC-DC converter, for a charging cycle of the load;
      performing a first comparison of the current demand to one or more current demand thresholds; and
      generating a voltage setpoint for the bulk capacitor based on the first comparison, wherein the generation of the voltage setpoint limits output current ripple of the DC-DC converter for the charging cycle.

2. The system of claim 1, wherein the current demand is determined based on one or more of: a current limit associated with the load, a voltage limit associated with the load, a voltage level associated with a voltage source connected to the AC-DC converter, or a circuit topology of the AC-DC converter.

3. The system of claim 1, wherein the one or more current demand thresholds include a low current demand threshold and a high current demand threshold, wherein the operations further include:
   determining a load current through the load;
   performing a second comparison of the current demand to the load current in response to the current demand being determined to be less than or equal to the low current demand threshold; and
   generating an output current error based on the second comparison,
   wherein the voltage setpoint is further generated based on the output current error.

4. The system of claim 3, wherein the operations further include:
   detecting a previously generated voltage setpoint of the bulk capacitor; and
   adjusting the generated voltage setpoint based on the previously generated voltage setpoint.

5. The system of claim 1, wherein the one or more current demand thresholds include a low current demand threshold high current demand threshold, wherein the operations further include:
   determining a switching frequency of the DC-DC converter;
   determining a minimum switching frequency threshold of the DC-DC converter and a switching frequency demand threshold of the DC-DC converter; and
   performing a third comparison of the switching frequency to the minimum switching frequency threshold in response to the current demand being determined to be greater than or equal to the high current demand threshold,
   wherein the voltage setpoint is increased in response to the switching frequency being determined to be less than the minimum switching frequency threshold, to cause the switching frequency to adjust to a value between the minimum switching frequency threshold and the switching frequency demand threshold.

6. The system of claim 1, wherein the one or more current demand thresholds include a low current demand threshold and a high current demand threshold, wherein the operations further include:

determining a switching frequency of the DC-DC converter;
determining a minimum switching frequency threshold of the DC-DC converter and a switching frequency demand threshold of the DC-DC converter; and
performing a fourth comparison of the switching frequency to the switching frequency demand threshold in response to the current demand being determined to be greater than or equal to the high current demand threshold,
wherein the voltage setpoint is decreased in response to the switching frequency being determined to be greater than the switching frequency demand threshold, to cause the switching frequency to adjust to a value between the minimum switching frequency threshold and the switching frequency demand threshold.

7. The system of claim 1, wherein the one or more current demand thresholds include a low current demand threshold and a high current demand threshold, wherein the operations further include:
determining a switching frequency of the DC-DC converter;
determining a minimum switching frequency threshold of the DC-DC converter and a switching frequency demand threshold of the DC-DC converter; and
performing a fifth comparison of the switching frequency to the minimum switching frequency threshold and the switching frequency demand threshold in response to the current demand being determined to be greater than or equal to the high current demand threshold,
wherein the voltage setpoint is unchanged in response to the switching frequency being determined to be between the minimum switching frequency threshold and the switching frequency demand threshold.

8. The system of claim 1, wherein the load includes a battery, and
wherein the AC-DC converter is configured to provide the system as a battery charger for the battery of the load for the charging cycle.

9. The system of claim 8, further comprising:
a motor configured to rotate based on power received from the battery,
wherein the system is provided as a vehicle,
wherein the one or more current demand thresholds include a low current demand threshold and a high current demand threshold,
wherein generating the voltage setpoint is based on a frequency based offset control method or a current based offset control method of the DC-DC converter,
wherein the frequency based offset control method is triggered when the current demand is less than or equal to the low current demand threshold, and
wherein the current based offset control method is triggered when the current demand is greater than or equal to the high current demand threshold.

10. A method for controlling a system, the system comprising an alternating current (AC) to direct current (DC) converter (AC-DC converter); a DC-DC converter connectable to the AC-DC converter, the AC-DC converter including a bulk capacitor; and a load connectable to the DC-DC converter, the method comprising:
performing, by one or more controllers, operations for a current based offset control method for the DC-DC converter, including:
determining a current demand of the load for a charging cycle;
determining a current through the load;
performing a comparison of the current demand to the current in response to the current demand being determined to be less than or equal to a low current demand threshold;
generating an output current error based on the comparison; and
generating a voltage setpoint of the bulk capacitor based on the output current error, to limit output current ripple of the DC-DC converter for the charging cycle.

11. The method of claim 10, wherein a switching frequency for the DC-DC converter is fixed to a resonant frequency of the DC-DC converter for the charging cycle.

12. The method of claim 10, wherein the DC-DC converter includes an LLC resonant converter.

13. The method of claim 10, wherein the load includes a battery, wherein the AC-DC converter is configured to provide the system as a battery charger for the battery of the load for the charging cycle.

14. The method of claim 10, wherein the operations further include:
detecting a previously generated voltage setpoint of the bulk capacitor; and
adjusting the generated voltage setpoint based on the previously generated voltage setpoint.

15. The method of claim 10, wherein the current demand is determined based on one or more of: a current limit associated with the load, a voltage limit associated with the load, a voltage level associated with a voltage source connected to the AC-DC converter, and a circuit topology of the AC-DC converter.

16. A system comprising:
one or more controllers configured to perform operations including:
determining a current demand of a load for a charging cycle;
determining a switching frequency of a direct current (DC) to DC converter (DC-DC converter);
determining a minimum switching frequency threshold of the DC-DC converter and a switching frequency demand threshold of the DC-DC converter;
performing a comparison of the switching frequency to the minimum switching frequency threshold and the switching frequency demand threshold in response to the current demand being determined to be greater than or equal to a high current demand threshold; and
generating a voltage setpoint for a bulk capacitor based on the comparison, to limit output current ripple of the DC-DC converter for the charging cycle.

17. The system of claim 16, the operations further including:
increasing the generated voltage setpoint in response to the switching frequency being determined to be less than the minimum switching frequency threshold, to cause the switching frequency to adjust to a value between the minimum switching frequency threshold and the switching frequency demand threshold.

18. The system of claim 16, the operations further including:
decreasing the voltage setpoint in response to the switching frequency being determined to be greater than the switching frequency demand threshold, to cause the switching frequency to adjust to a value between the minimum switching frequency threshold and the switching frequency demand threshold.

19. The system of claim 16, the operations further including:

maintaining the voltage setpoint in response to the switching frequency being determined to be between the minimum switching frequency threshold and the switching frequency demand threshold.

20. The system of claim 16, wherein the switching frequency comprises an instantaneous switching frequency, wherein the DC-DC converter is configured to operate in a fixed duty cycle mode, and wherein the minimum switching frequency threshold includes a first value less than a resonant frequency of the DC-DC converter and the switching frequency demand threshold includes a second value greater than the resonant frequency of the DC-DC converter.

* * * * *